(12) United States Patent
Tanaka

(10) Patent No.: US 10,661,445 B2
(45) Date of Patent: May 26, 2020

(54) HOLDING MECHANISM, MANIPULATOR, AND HANDLING ROBOT SYSTEM

(71) Applicant: Kabushiki Kaisha Toshiba, Minato-ku (JP)

(72) Inventor: Junya Tanaka, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/889,644

(22) Filed: Feb. 6, 2018

(65) Prior Publication Data
US 2019/0084162 A1 Mar. 21, 2019

(30) Foreign Application Priority Data

Sep. 15, 2017 (JP) ................. 2017-178192

(51) Int. Cl.
*B25J 15/00* (2006.01)
*B25J 15/06* (2006.01)
*B25J 9/16* (2006.01)
*B25J 9/00* (2006.01)

(52) U.S. Cl.
CPC ......... *B25J 15/0023* (2013.01); *B25J 9/0093* (2013.01); *B25J 9/1612* (2013.01); *B25J 9/1697* (2013.01); *B25J 15/0009* (2013.01); *B25J 15/0616* (2013.01); *B25J 15/0625* (2013.01); *G05B 2219/39543* (2013.01); *Y10S 901/09* (2013.01); *Y10S 901/40* (2013.01); *Y10S 901/47* (2013.01)

(58) Field of Classification Search
CPC .................................. B25J 15/0023; B25J 15/0009; B25J 15/0625; B25J 9/1612

USPC .................................. 294/185, 188, 189
See application file for complete search history.

(56) References Cited

U.S. PATENT DOCUMENTS

| | | | | |
|---|---|---|---|---|
| 3,343,864 A * | 9/1967 | Baer | ............... | B25J 15/0009 294/119.3 |
| 3,354,856 A * | 11/1967 | Annibale | ............... | B63C 7/22 114/51 |
| 3,415,388 A * | 12/1968 | Domhan | ............... | A23G 7/0025 414/795.6 |
| 3,981,528 A * | 9/1976 | Andorf | ............... | B25J 15/0023 294/119.3 |
| 4,527,783 A * | 7/1985 | Collora | ............... | B23Q 1/032 269/21 |
| 4,787,812 A * | 11/1988 | Gopfert | ............... | B66C 1/0212 414/737 |
| 4,928,926 A * | 5/1990 | Bloemendal | ............... | B66F 3/35 254/93 R |

(Continued)

FOREIGN PATENT DOCUMENTS

| | | |
|---|---|---|
| JP | 4-48592 | 8/1992 |
| JP | 2007-120513 | 5/2007 |

(Continued)

*Primary Examiner* — Paul T Chin
(74) *Attorney, Agent, or Firm* — Oblon, McClelland, Maier & Neustadt, L.L.P.

(57) ABSTRACT

According to one embodiment, a holding mechanism includes a plurality of links, a first elastic body, and a second elastic body. The plurality of links are rotatably connected to one another at ends of the links. The first elastic body is disposed along the links. The second elastic body is interposed between adjacent links of the links so as to be along the first elastic body.

16 Claims, 9 Drawing Sheets

(56) References Cited

U.S. PATENT DOCUMENTS

| | | | | |
|---|---|---|---|---|
| 4,961,606 | A | * | 10/1990 | Nilsson .................. B66F 9/181 294/65 |
| 5,245,885 | A | * | 9/1993 | Robertson ............ B25J 15/0009 294/119.3 |
| 7,654,595 | B2 | | 2/2010 | Yokoyama et al. |
| 2007/0152458 | A1 | * | 7/2007 | Guidetti .................. B65B 5/12 294/188 |
| 2016/0207195 | A1 | * | 7/2016 | Eto ........................ B25J 9/1612 |
| 2017/0182656 | A1 | | 6/2017 | Tanaka |
| 2017/0253438 | A1 | * | 9/2017 | Tanaka .................. B25J 9/0018 |
| 2018/0281207 | A1 | * | 10/2018 | Tanaka ................ B25J 15/0052 |

FOREIGN PATENT DOCUMENTS

| | | | |
|---|---|---|---|
| JP | 2014151371 | * | 8/2014 |
| JP | 5692781 | | 4/2015 |
| JP | 2017-113864 | | 6/2017 |
| WO | WO 2004/000508 | | 12/2003 |

* cited by examiner

EXPANDED STATE

CONTRACTED STATE

HOLDING MECHANISM, MANIPULATOR, AND HANDLING ROBOT SYSTEM

CROSS-REFERENCE TO RELATED APPLICATION

This application is based upon and claims the benefit of priority from Japanese Patent Application No. 2017-178192, filed on Sep. 15, 2017; the entire contents of which are incorporated herein by reference.

FIELD

Embodiments described herein relate generally to a holding mechanism, a manipulator, and a handling robot system.

BACKGROUND

In distribution warehouses or production sites, a holding mechanism attached to a leading end of a manipulator or the like is used to hold an object and move the object to a desired place. In general, the holding mechanism is small in size, light in weight, and has a high holding force. Therefore, it is desired that the holding mechanism can hold various shapes of objects.

DETAILED DESCRIPTION

Figure 1:
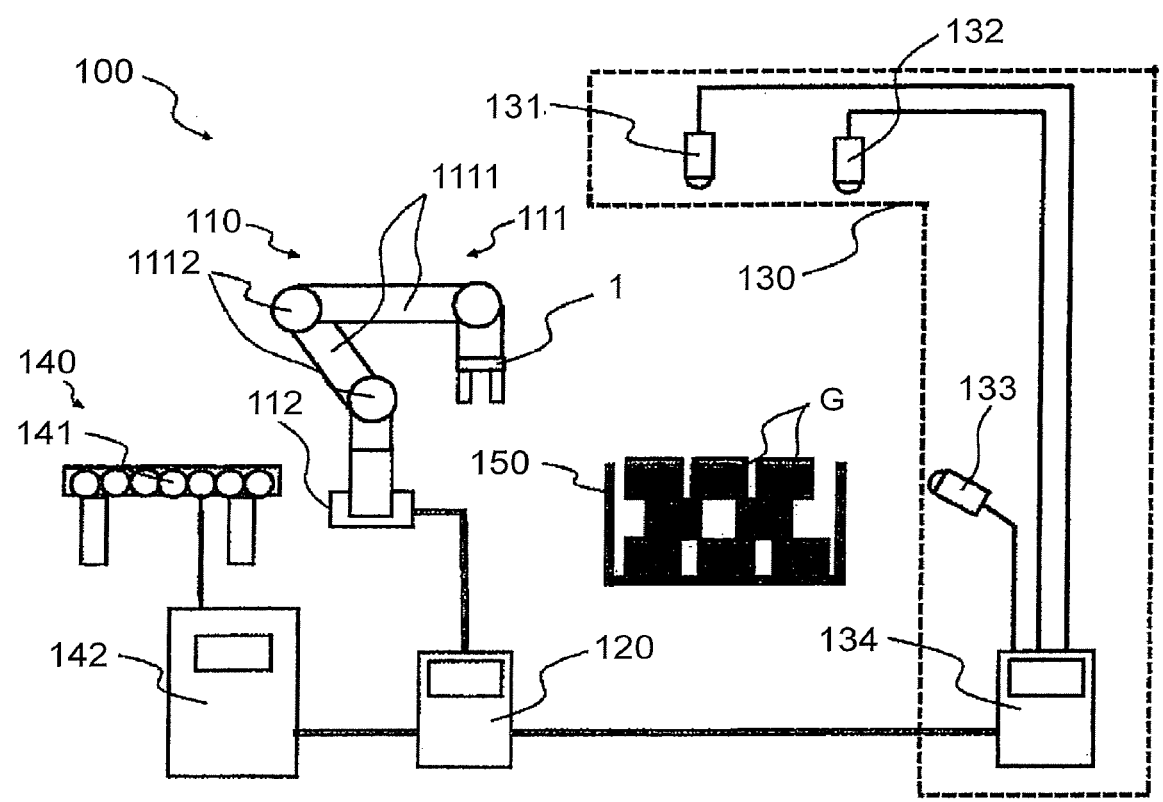
FIG. 1 is a schematic view showing an example of a handling robot system using a holding mechanism according to the first embodiment.

According to one embodiment, a holding mechanism includes a plurality of links, a first elastic body, and a second elastic body. The plurality of links are rotatably connected to one another at ends of the links. The first elastic body is disposed along the links. The second elastic body is interposed between adjacent links of the links so as to be along the first elastic body.

Hereinafter, a holding mechanism, a manipulator, and a handling robot system according to embodiments will be described with reference to the drawings. Those with the same reference numerals indicate the same elements. It should be noted that the drawings are schematic or conceptual, and the relationship between the thickness and the width of each portion, the ratio coefficient of the size between the portions, and the like are not necessarily the same as the actual ones. Also, even in a case of representing the same portions, the dimensions and ratio coefficients may be different from each other depending on the drawing.

First Embodiment

A first embodiment will be described below with reference to FIG. 1. FIG. 1 is a schematic view showing an example of a handling robot system using a holding mechanism according to the first embodiment.

As shown in FIG. 1, the handling robot system 100 includes a manipulator 110, a control device 120, a recognition device 130, and a conveyance device 140.

The handling robot system 100 recognizes a plurality of objects G placed on a loading area 150 by the recognition device 130. Then, using a result of the recognition, the control device 120 transfers the objects G to the conveyance device 140 while holding the objects G by driving the manipulator 110. In addition, the objects G positioned on the conveyance device 140 are held by the manipulator 110, and the objects G are placed on the loading area 150. The objects G include a product contained in a cardboard box, a packaged product, a product itself, and the like. In addition, the objects G are not limited to goods and widely include objects with external shapes.

First, the manipulator 110 will be described. As shown in FIG. 1, the manipulator 110 includes a driving mechanism 111, a base part 112, and a holding mechanism 1 capable of holding an object G.

The driving mechanism 111 includes at least two links 1111, and a plurality of joints 1112 respectively connecting the ends of the links 1111. The holding mechanism 1 is installed at a leading end of the link 1111 through, for example, the joint 1112. The joint 1112 is configured, by for example, a motor, an encoder, a reduction gear, and the like. The driving mechanism 111 enables each link to be rotated or linearly moved by driving the motor. Therefore, the holding mechanism 1 installed at the leading end is moved. The joint 1112 is not limited to rotation in one axial direction but includes rotation in multiple axial directions. The driving mechanism 111 is a so-called vertical articulated type robot. Further, the driving mechanism 111 may be configured by a combination of a linear moving mechanism in the directions of three axes (XYZ axes), a rotation shaft that rotates the link, and a joint.

The base part 112 is fixed to an end of the driving mechanism 111. The base part 112 is installed on a floor surface or on the ground. The base part 112 may be, for example, a movable truck, and the manipulator 110 may be movable on the floor surface.

Figure 2A:
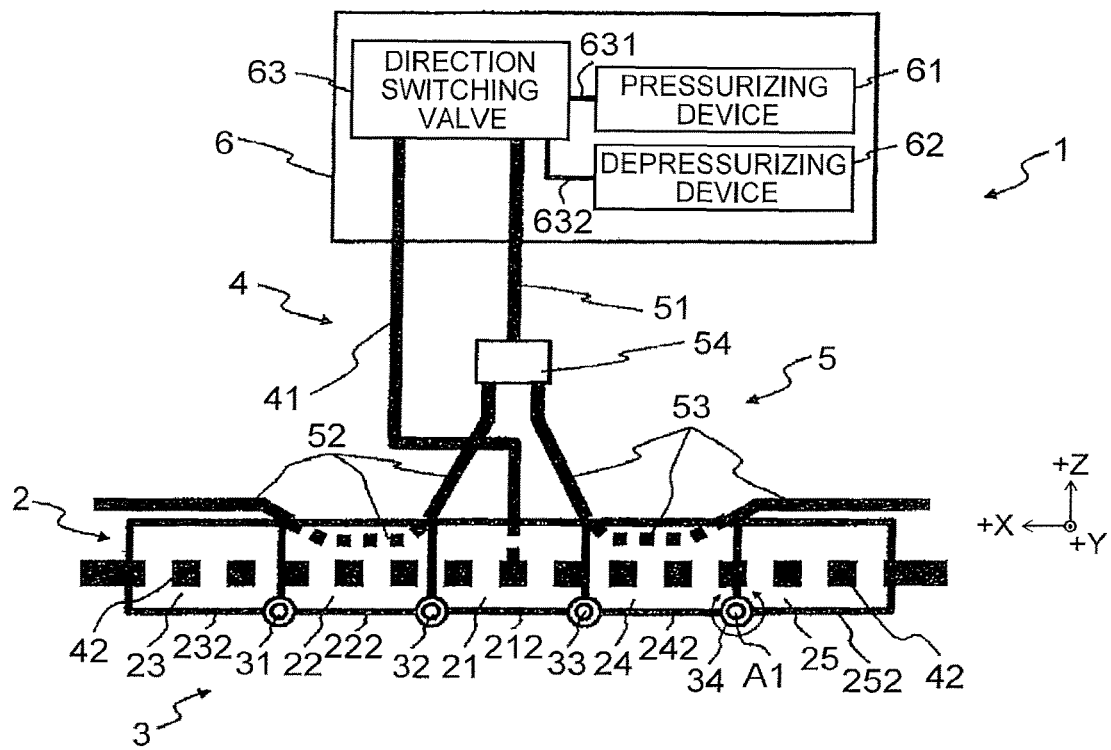
FIGS. 2A and 2B are diagrams showing a configuration of a holding mechanism according to the first embodiment.
Figure 2B:
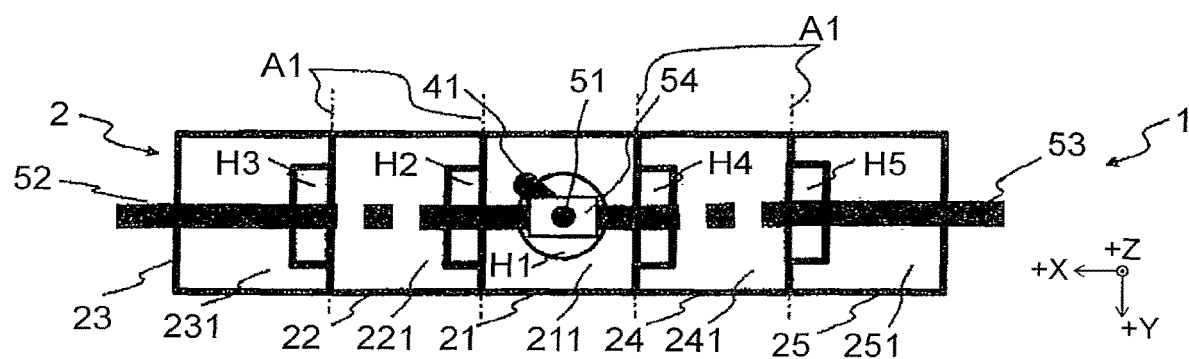

Next, the holding mechanism 1 will be described. FIGS. 2A and 2B are diagrams showing configuration of the holding mechanism 1 according to the first embodiment. FIG. 2A is a front view of the holding mechanism 1 as seen in the +Y direction. FIG. 2B is a top view of the holding mechanism 1 as seen in the +Z direction. In the holding mechanism 1 shown in FIGS. 2A and 2B, the holding mechanism 1 is in "an opened state". The "opened state" represents an example of a state of the holding mechanism 1 in a case of holding no object. On the other hand, a "closed state" represents a state of the holding mechanism in a case of holding an object.

Here, for the convenience of description, definition is made for +X direction, −X direction, +Y direction, −Y direction, +Z direction, and −Z direction. +X direction, −X direction, +Y direction, and −Y direction are directions along, for example, a substantially horizontal surface. −X direction is a direction opposite to +X direction. In embodiments, the +X direction and the −X direction are "a direction in which a link 2 is arranged in the state in which the holding mechanism 1 is opened. +Y direction is a direction intersecting with +X direction (for example, substantially orthogonal direction). −Y direction is a direction opposite to +Y direction. +Z direction is a direction intersecting with +X direction and +Y direction (for example, substantially orthogonal direction), for example, substantially vertically upward direction. −Z direction is a direction opposite to +Z direction, for example, a substantially vertically downward direction. Since the defined coordinate axes are based on the holding mechanism 1, the defined coordinate axes are appropriately changed according to the orientation of the holding mechanism 1 installed in the manipulator 110.

As shown in FIGS. 2A and 2B, the holding mechanism 1 includes a plurality of links 2, a plurality of rotary joints 3, a first elastic body 4, a second elastic body 5, a pressure source 6, and a base (not shown).

The holding mechanism 1 drives the plurality of links by changing internal pressure of the first elastic body 4 and the second elastic body 5 using the pressure source 6, thus holding an object G.

In the present embodiment, the links 2 are five links 21 to 25. Each of the links 21 to 25 has a hallow structure such that the first and second elastic bodies can pass through the links 21 to 25. As shown in FIGS. 2A and 2B, each link has a substantially rectangular parallelepiped shape and is arranged in parallel in the X direction. It is preferable to remove the wall surfaces of each link in the X direction such that the first and second elastic bodies can pass through the links in the X direction. A hole H1 is provided in the wall surface 211 of the link 21 in the +Z direction such that the first elastic body 4 can be inserted from the outside. Also, holes H2, H3, H4, and H5 are provided in the wall surfaces 221 to 251 of the links 22 to 25 in the +Z direction. As shown in FIG. 2B, the holes H2, H3, H4, and H5 may be provided as notches in the wall surfaces 221 to 251. Rotary joints 3 (31 to 34) are respectively provided at the ends of the links in the X direction, and the links are connected at the rotary joints 3 (31 to 34). Each of the links is rotatable around the rotary joint 3. As shown in FIG. 2A, the rotary joints 31 to 34 are provided at the ends of the wall surfaces 212 to 252 of the links 21 to 25 in the −Z direction. In addition, a contact sensor (not shown) or a pressure sensor (not shown) capable of detecting contact with the object G may be provided on the outer surfaces of the links 21 to 25 in the −Z direction. These sensors are connected to a control device 120 to be described below.

The links 21 to 25 are formed of a metal member or a resin member. The members of the links 21 to 25 may be any members as long as they can secure a certain degree of rigidity.

The rotary joint 3 has a shaft A1 and is rotatable around the shaft A1. The direction of the shaft A1 is substantially parallel to the Y direction. The links 21 to 25 are connected at the rotary joints 31 to 34, respectively. The rotary joint 3 may be, for example, a bearing or the like. An angle sensor capable of measuring a rotation angle of the link (not shown) may be provided in each rotary joint 3. As the angle sensor, an encoder, a potentiometer, or the like is used. The angle sensor is connected to the control device 120 to be described below.

As shown in FIG. 2A, the first elastic body 4 includes a first portion 41 and a second portion 42. The first portion 41 is inserted into the inside of the link 2 from the hole H1 of the link 21.

The first portion 41 is a cylindrical tube through which a fluid can flow.

The second portion 42 is branched into two in the ±X directions from the first portion 41 in the inside of the link 2. A portion of the first elastic body 4 positioned inside the link 2 is represented by a broken line in FIG. 2A. The second portion 42 is arranged along the links 21 to 25. The arrangement "along" indicates that the second portion 42 is arranged substantially parallel to the direction in which the links 21 to 25 are aligned, for example. The first portion 41 of the first elastic body 4 is connected to a pressure source 6, which will be described below, outside the link 2. The second portion 42 of the first elastic body 4 is a flat tube capable of allowing a fluid to flow therein and capable of expanding or contracting due to a change in internal pressure. The end of the second portion 42 is hermetically sealed such that no fluid flows out from the end.

Figure 3A:
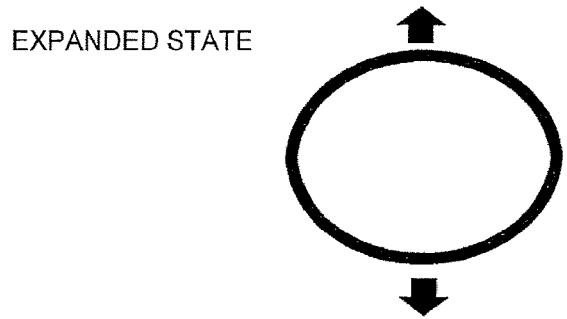
FIGS. 3A and 3B are cross-sectional views showing an example of expanded state and contracted state of the flat tube.
Figure 3B:

FIGS. 3A and 3B are cross-sectional views showing an example of expanded state and contracted state of the flat tube. The flat tube is a tube formed in such a way that a thermoplastic tube is formed to have a flattened sectional shape by pressure-welding in a state in which the thermoplastic tube is heated. The material of the thermoplastic tube may be, for example, urethane. When no fluid is supplied to the flat tube, the cross section of the flat tube becomes a flattened state. As shown in FIG. 3A, when the fluid is supplied to the inside of the flat tube (as the internal pressure rises), the length of the outer periphery does not change and a force is generated in a direction perpendicular to the longitudinal direction of the cross section of the flat tube, expanding the flat tube. On the other hand, as shown in FIG. 3B, when the fluid is not supplied to the inside of the flat tube, the flat tube is in a flattened state. The flat tube becomes highly rigid in a bending direction in the expanded state. That is, the second portion 42 of the first elastic body 4 has high rigidity along the X direction in the expanded state. In addition, a sensor (not shown) capable of measuring a pressure or a flow rate of the inside of the first elastic body 4 may be provided in the first elastic body 4. These sensors are connected to the control device 120 to be described below.

As shown in FIGS. 2A and 2B, the second elastic body 5 includes a third portion 51, a fourth portion 52, a fifth portion 53, and a coupling part 54.

The third portion 51 is connected to the fourth portion 52 and the fifth portion 53 through the coupling part 54. The third portion 51 is connected to the pressure source 6, which will be described below. The third portion 51 is a cylindrical tube through which a fluid can flow. The third portion 51 and the coupling part 54 are arranged outside the link 2. A portion of the second elastic body 5 positioned inside the link 2 is represented by a broken line in FIGS. 2A and 2B.

The fourth portion 52 is inserted into the link 22 from the hole H2 of the link 22. When viewed from a different point of view, the fourth portion 52 is inserted from the hole H2 so as to be along the second portion 42 of the first elastic body 4 inside the link 22. As shown in FIGS. 2A and 2B, the fourth portion 52 is inserted from the hole H2 between the link 21 and the link 22, and protruded to the outside of the link 2 from the hole H3 of the link 23 through the inside of the link 22. "Between link 21 and link 22" indicates a place having a notch shape when the hole H2 provided in the link 22 has a notch shape as shown in FIG. 2B. In addition, when the hole H2 provided in the link 22 is provided at a central portion of the wall surface 221 like the hole H1 of the link 21, the hole H2 is indicated. What has been described above is applicable to other links.

The fourth portion 52 is formed of a flat tube, like the second portion 42 of the first elastic body 4. A leading end of the fourth portion 52 which protrudes toward the outside of the link 2 is hermetically sealed such that a fluid does not flow out from the leading end.

The fifth portion 53 is inserted into the link 24 from the hole H4 of the link 24. When viewed from a different point of view, the fifth portion 53 is inserted from the hole H4 so as to be along the second portion 42 of the first elastic body 4 inside the link 24.

As shown in FIGS. 2A and 2B, the fifth portion 53 is inserted from the hole H4 between the link 21 and the link 24, and protruded to the outside of the link 2 from the hole H5 of the link 25 through the inside of the link 24. The fifth portion 53 is arranged substantially symmetrically to the fourth portion 52 with respect to the third portion 51. The fifth portion 53 is formed of a flat tube. A leading end of the fifth portion 53 which protrudes toward the outside of the link 2 is hermetically sealed such that a fluid does not flow out from the leading end.

In addition, a sensor (not shown) capable of measuring a pressure or a flow rate of the inside of the second elastic body 5 may be provided in the second elastic body 5. These sensors are connected to the control device 120 to be described below.

The coupling part 54 connects the third portion 51, the fourth portion 52, and the fifth portion 53. The third to fifth portions communicate with one another through the coupling part 54. The coupling part 54 is not an essential structure when the third to fifth portions are integrally formed.

As shown in FIG. 2A, the pressure source 6 includes a pressurizing device 61, a depressurizing device 62, and a direction switching valve 63. The first elastic body 4 and the second elastic body 5 are connected to the pressure source 6.

The pressurizing device 61 increases pressure inside the elastic body by supplying fluid to the inside of the first elastic body 4 or the second elastic body 5. As a result, the first elastic body 4 and the second elastic body 5 are expanded. As the pressurizing device 61, a compressor may be used. In addition to the compressor, for example, air may be taken from an air pump in a factory, which may function as the pressurizing device 61.

The depressurizing device 62 reduces internal pressure by sucking the fluid inside the first elastic body 4 or the second elastic body 5. As a result, the first elastic body 4 and the second elastic body 5 are contracted. The depressurizing device 62 may use a pump. In addition to the pump, for example, a depressurizing device 62 may be provided by combining a pressurizing device with a vacuum generator to generate a negative pressure. Here, the fluid includes not only air but also liquids such as water and oil, such as gases other than air.

The direction switching valve 63 is connected to the pressurizing device 61 via a tube 631 and to the depressurizing device 62 via a tube 632. In addition, the first portion 41 of the first elastic body 4 and the third portion 51 of the second elastic body 5 are connected to the direction switching valve 63. The direction switching valve 63 switches to which of the pressurizing device 61 and the depressurizing device 62, the first portion 41 is connected. In addition, the direction switching valve 63 switches to which of the pressurizing device 61 and the depressurizing device 62, the third portion 51 is connected.

The pressure source 6 is connected to the control device 120 to be described below, and the driving of the pressurizing device 61, the depressurizing device 62, and the direction switching valve 63 is controlled. In addition, the pressure source 6 has its own controller (not shown), and the controller may control the pressurizing device 61, the depressurizing device 62, and the direction switching valve 63. Although the pressure source 6 is described as the configuration of the holding mechanism 1, the present embodiment is not limited thereto. The pressure source 6 may be provided in the base part 112 of the manipulator 110, or may be implemented as other configurations than the holding mechanism 1.

The base is connected to the link 21 and accommodates a part of the first elastic body 4 or the second elastic body. In addition, the base may accommodate the pressure source 6. The base is connected to an end of the driving mechanism 111. The base may be equipped with a camera or optical sensor (not shown) capable of recognizing a distance to an object G, and a position or shape of the object G. The base may also be equipped with a sensor (not shown) capable of measuring a weight of the object G. These sensors are connected to the control device 120 to be described below.

Figure 4:
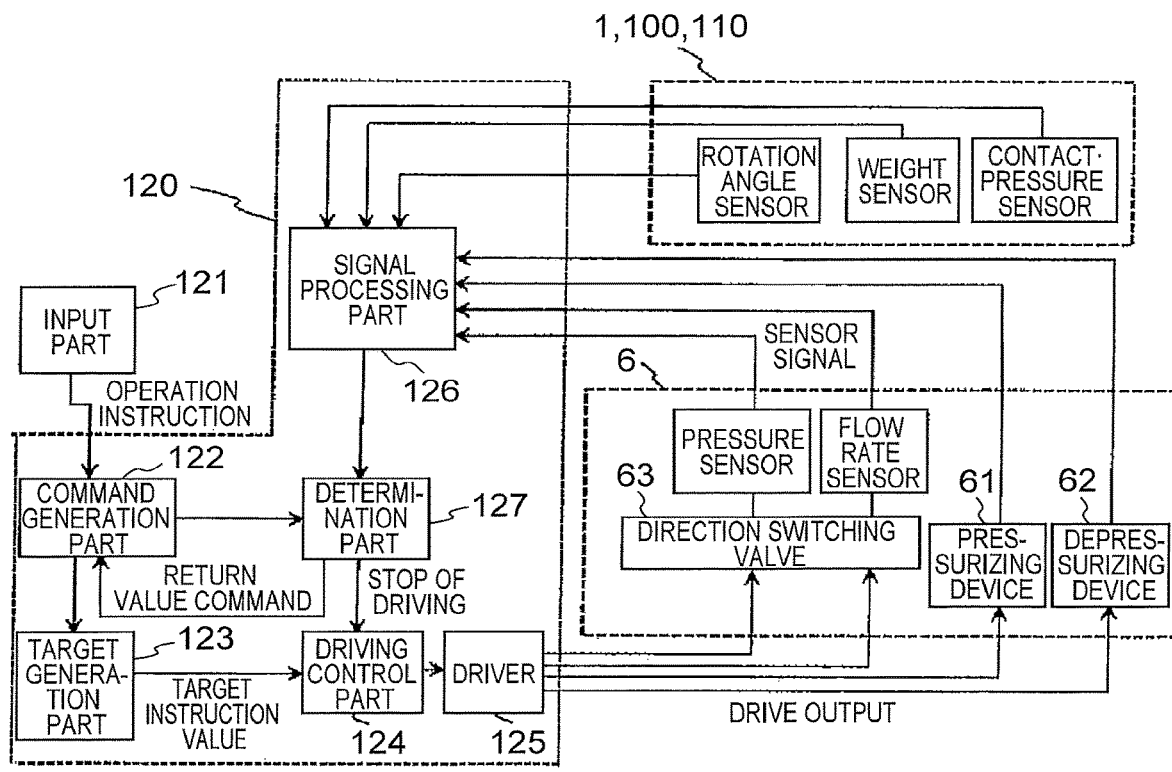
FIG. 4 is a block diagram showing relationship between configuration of a control device and various types of sensors and a pressure source.

Next, the control device 120 will be described. FIG. 4 is a block diagram showing relationship between configuration of the control device 120 and various types of sensors and the pressure source 6.

As shown in FIG. 4, the control device 120 includes an input part 121, a command generation part 122, a target generation part 123 that generates a target instruction value, a drive control part 124, a driver 125, a signal processing part 126, and a determination part 127.

The input part 121 is a place into which the operation instruction information of the manipulator 110 is input. The input to the input part 121 may be direct input, for example, via a touch panel or a monitor, or may be input from a remote place in a radio manner or a wired manner. When radio communication is performed, the input part 121 functions as a communication part. The communication part receives operation instruction information from an external computer or a server. Although a radio communication device is preferable as a communication part, the communication device may be configured as a communication network. As the communication network, for example, internet, intranet, extranet, LAN, ISDN, VAN, CATV communication network, virtual private network, telephone line, mobile communication network, satellite communication network and the like may be used. The transmission medium configuring the communication network is not particularly limited, and wired medium such as IEEE 1394, USB, power line carrier, cable TV line, telephone line, ADSL line, and wireless medium such as infrared line such as IrDA and remote controller, Bluetooth®, 802.11 wireless, HDR, portable telephone network, satellite line, terrestrial digital network and the like may be used. The input part transmits the operation instruction information to the command generation part 122. Alternatively, a microphone is installed in the input part, and the operation instruction information may be input by the operator's (user's) voice. The input part 121 is not necessarily a required component in a case where the handling robot system 100 automatically recognizes the object G and performs driving operation.

The command generation part 122 generates, as an operation command, operation procedures required for each operation process, based on the operation instruction information and the result of recognition of the object G in the recognition device 130 which will be described below. The command generation part 122 generates pieces of operation mode information respectively corresponding to operation commands to be executed. The operation commands are commands related with a series of operations of the manipulator 110, for example, information as a program. The operating mode information is information related with an individual operation. For example, there are operations to "open" or "lower" the holding mechanism 1. The command generation part 122 has a storage that stores operation mode information and the like. The storage also stores posture data such as a shape, a weight, or flexibility of an object that is a target to be held, in advance. Examples of the storage includes a tape system such as a magnetic tape or a cassette tape, a disk system including a magnetic disk, for example, a Floppy® disk, a hard disk or the like or an optical disk, for example, a CD-ROM/MO/MD/DVD/CD-R or the like, a card system such as an IC card (including a memory card)/an optical card or the like, or a semiconductor memory such as a mask ROM, an EPROM, an EEPROM, a flash ROM or the like. The command generation part 122 outputs the operation command to the target generation part 123. The command generation part 122 associates each operation mode of the operation command with practical operation information stored in the storage, and outputs them to the determination part 127.

The target generation part 123 receives the operation command for the driving mechanism 111 and the holding mechanism 1 from the command generation part 122. The target generation part 123 generates target instruction values for the driving mechanism 111 and the holding mechanism 1. The target instruction value is output to the drive control part 124.

The drive control part 124 receives the target instruction value for the driving mechanism 111 and the holding mechanism 1 from the target generation part 123, and generates the drive instruction information for driving the driving mechanism 111 and the holding mechanism 1 according to the target instruction value. The drive instruction information is output to the driver 125.

The driver 125 receives the drive instruction information for the driving mechanism 111 and the holding mechanism 1 from the drive control part 124, and generates a drive output. The driving mechanism 111 and the holding mechanism 1 receive the drive output from the driver 125, and adjust a drive amount by operating an actuator or the like. The actuator may use, for example, a combination of a motor and a feed screw, or a pneumatic cylinder.

The signal processing part 126 receives a signal from various sensors (for example, an angle sensor, a pressure sensor and a flow rate sensor of the pressure source 6), the pressurizing device 61, the depressurizing device 62, and the direction switching valve 63 of the pressure source 6, which is caused by driving of the driving mechanism 111 and the holding mechanism 1, and performs signal amplification processing or analog-digital conversion processing on the sensor signal. For example, the pressure sensor senses an operation of the direction switching valve 63 and generates a sensor signal. The flow rate sensor senses an operation of the direction switching valve 63 and generates a sensor signal. The angle sensor provided in the rotary joint 3 senses motion of the joint and generates a sensor signal. These sensor signals are, for example, voltage values. By sensing the internal pressures of the first elastic body 4 and the second elastic body 5 by the pressure sensor, the control device 120 can determine existence/non-existence of damage of the first elastic body 4 and the second elastic body 5. Also, by sensing flow rates of the first elastic body 4 and the second elastic body 5 by the flow rate sensor, the control device 120 can determine whether the first elastic body 4 and the second elastic body 5 are expanded by supplying fluid to the first elastic body 4 and the second elastic body 5, or whether the first elastic body 4 and the second elastic body 5 are contracted by sucking the fluid therefrom. By sensing a rate of flow flowing into the first elastic body 4 and the second elastic body 5, the control device 120 can estimate a deformation speed of the first elastic body 4 and the second elastic body 5 respectively.

The determination part 127 receives the sensor signal obtained by conversion by the signal processing part 126. The determination part 127 determines adjustment of an opening/closing amount of the holding mechanism 1, a holding state of an object G, a state of the first and second elastic bodies, according to the sensor signal. The determination part 127 receives the operation information of the driving mechanism 111 and the holding mechanism 1 corresponding to the operation command, from the command generation part 122. The determination part 127 compares the operation information with information based on the sensor signals. Based on a result of the comparison, the determination part 127 generates an operation command, such as a command for stopping the drive of the driving mechanism 111 and the holding mechanism 1, or a command for correcting a posture of the driving mechanism 111 according to an object state. The determination part 127 outputs a return value command for correcting the operation command to the command generation part 122. Due to the return value command, the command generation part 122 can correct the operation command and perform a processing operation suitable for the operation instruction information input by the input part. Therefore, assurance and reliability of the operation of the holding mechanism 1 are improved.

The command generation part 122, the target generation part 123, the drive control part 124, the signal processing part 126, and the determination part 127 include a central processing unit (CPU), a memory, an auxiliary storage or the like, and execute a program or the like. Further, all or some thereof may be realized using hardware such as application specific integrated circuit (ASIC), programmnable logic device (PLD) or field programmable gate array (FPGA).

Next, the recognition device 130 will be described. As shown in FIG. 1, the recognition device 130 recognizes a plurality of objects G placed in the loading area 150.

The recognition device 130 includes a first image sensor 131 to a third image sensor 133, and a calculator 134 connected to each of the image sensors.

The first image sensor 131 to the third image sensor 133 are positioned in an oblique front surface, an upper surface, and an oblique rear surface with respect to the plurality of objects G placed on the loading area 150, for example. The first image sensor 131 to the third image sensor 133 may be movable. The first image sensor 131 to the third image sensor 133 may use a three-dimensional camera capable of measuring positions, such as a distance image sensor or an infrared dot pattern projection camera. The infrared dot pattern projection camera projects an infrared dot pattern onto a target object and then captures an infrared image of the object G placed on the loading area 150 in that state. It is possible to obtain the three-dimensional information of the object G by analyzing the infrared image. The infrared dot pattern projection camera may capture a color image or a monochrome image. In addition to the infrared dot pattern projection camera, an optical sensor such as a camera that acquires a color image or a monochrome image may be included. The image may be commonly used image data such as jpg, gif, png, or bmp. Although three image sensors have been described, the number of image sensors is not limited thereto, and may be more than one. In addition, two or more image sensors may be used.

The calculator 134 derives the position information of the object G, based on data output from the first image sensor 131 to the third image sensor 133. The three-dimensional position information of the object G is output to the control device 120. The control device 120 controls the manipulator 110 based on the position information of the object G. The calculator 134 includes, for example, a CPU, a memory, an auxiliary storage and the like, and executes a program or the like. However, all or some thereof may be realized using hardware such as ASIC, PLD, or FPGA.

Next, the conveyance device 140 will be described. As shown in FIG. 1, the conveyance device 140 is a place where the object G held by the manipulator 110 is placed and conveyed.

The conveyance device 140 includes a belt conveyor 141 in which, for example, a plurality of rollers are arranged in a predetermined direction and a belt is wound, and a conveyance control device 142. The belt conveyor 141 drives the belt by rotating the plurality of rollers in the predetermined direction to convey the objects G. The conveyance control device 142 controls the driving of the belt conveyor. For example, the conveyance speed and the conveyance direction are controlled.

The conveyance device 140 is not limited to the belt conveyor, and includes a roll conveyor, another sorting device, or the like. The conveyance control device 142 is, for example, a computer including a CPU, a memory, or an auxiliary storage. The operation of the conveyance device 140 is automatically controlled by the conveyance control device 142 through a pre-set program set, but may be also controlled in such a way that the operator manually manipulates the conveyance control device 142.

The loading area 150 is a place where the object G is stacked or placed. The loading area 150 may be a cage truck, a steer truck, a box palette, a pallet, a shelf, or the like.

Next, operation for holding an object G by the holding mechanism 1 according to the present embodiment will be described below in detail First, the control device 120 brings the holding mechanism 1 close to the object G by driving the manipulator 110, based on a result of recognition of the object G by the recognition device 130. In a case of the approaching operation, the state of the holding mechanism 1 is in an "opened state".

The control device 120 controls the pressure source 6 to drive the link 2 in order to put the holding mechanism 1 in an opened state. More specifically, the control device 120 drives the direction switching valve 63 to connect the pressurizing device 61 and the first portion 41 of the first elastic body 4. On the other hand, the control device 120 drives the direction switching valve 63 to connect the depressurizing device 62 and the third portion 51 of the second elastic body 5. Then, the control device 120 drives the pressurizing device 61 to increase the internal pressure of the first elastic body 4. At this time, the second portion 42 (flat tube) of the first elastic body 4 is expanded. On the other hand, the control device 120 drives the depressurizing device 62 to reduce the internal pressure of the second elastic body 5. At this time, the fourth portion 52 (flat tube) and the fifth portion 53 (flat tube) of the second elastic body 5 are contracted. That is, since the second portion 42 of the first elastic body 4 is hardened by expansion, and the fourth portion 52 and the fifth portion 53 of the second elastic body 5 are made flexible by the contraction, the link 2 is hardened in a direction along the X direction, for example (as shown in FIGS. 2A and 2B). The control device 120 may perform control to increase the internal pressure of the first elastic body 4 and then to decrease the internal pressure of the second elastic body 5. Alternatively, after the internal pressure of the second elastic body 5 is reduced, the control device 120 may perform control to increase the internal pressure of the first elastic body 4.

After the holding mechanism 1 comes close to the object G, the control device 120 puts the holding mechanism 1 to a "closed state" in order to hold the object G by the holding mechanism 1. More specifically, the control device 120 drives the direction switching valve 63 to connect the pressurizing device 61 and the third portion 51 of the second elastic body 5. On the other hand, the control device 120 drives the direction switching valve 63 to connect the depressurizing device 62 and the first portion 41 of the first elastic body 4. Then, the control device 120 increases the internal pressure of the second elastic body 5 by driving the pressurizing device 61. At this time, the fourth portion 52 (flat tube) and the fifth portion 53 (flat tube) of the second elastic body 5 are expanded. On the other hand, the control device 120 reduces the internal pressure of the first elastic body 4 by driving the depressurizing device 62. At this time, the second portion 42 (flat tube) of the first elastic body 4 contracts. That is, the fourth portion 52 and the fifth portion 53 of the second elastic body 5 are hardened by expansion, and the second portion 42 of the first elastic body 4 is made flexible by the contraction. The control device 120 may control to increase the internal pressure of the second elastic body 5 after decreasing the internal pressure of the first elastic body 4. Alternatively, after the internal pressure of the second elastic body 5 is increased, the control device 120 may control to decrease the internal pressure of the first elastic body 4.

Figure 5:
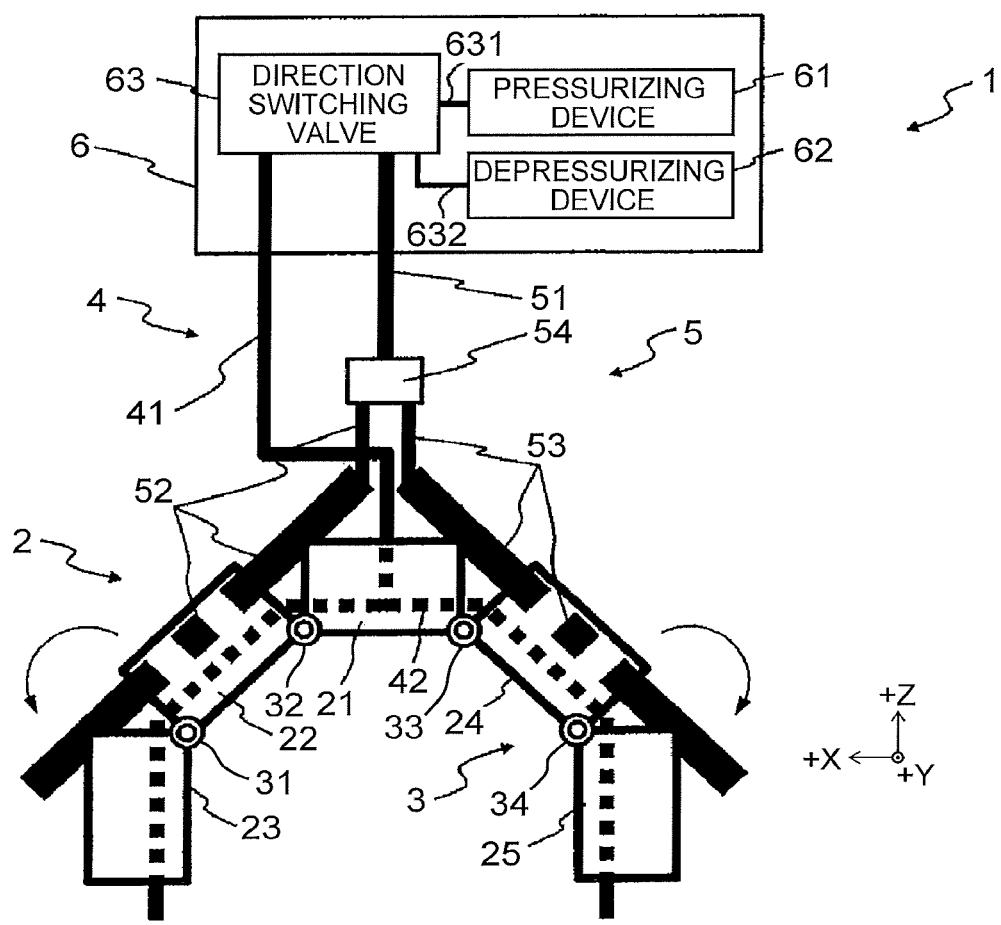
FIG. 5 is a diagram showing an example of a state in which the holding mechanism is closed.

FIG. 5 is a diagram showing an example of a state in which a holding mechanism 1 is closed. As shown in FIG. 5, since the fourth portion 52 of the second elastic body 5 is hardened, the link 22 and the link 23 are driven counter-clockwise (CCW) around the rotary joint 3 (31, 32). In addition, since the fifth portion 53 of the second elastic body 5 is hardened, the link 24 and the link 25 are driven clockwise (CW) around the rotary joint 3 (33, 34). Due to this, the holding mechanism 1 can hold the object G by clamping the object with the link 22 and the link 24, and the link 23 and the link 25. In order to stabilize the holding, a rubber-made member or the like for preventing slipping may be provided in a contact surface between each link and the object G.

A distance between the link 23 and the link 25 and a holding force in the state in which the holding mechanism 1 is closed are appropriately adjusted depending on an angle between the fourth portion 52 and the fifth portion 53 at the time of expansion, and on diameters of the fourth portion 52 and the fifth portion 53 at the time of expansion. For example, when it is desired to increase the distance between the link 23 and the link 25, it is preferable to increase a width of the link 21 in the X direction. Further, the distance between the coupling part 54 and the link 21 may be narrowed. Due to this, an angle between the fourth portion 52 and the fifth portion 53 at the time of expansion is increased, and the distance between the link 23 and the link 25 is increased. When it is desired to increase the holding force of the holding mechanism 1, for example, it is preferable to select a flat tube of which the cross-sectional diameter is large at the time of expansion. Further, when the pressurizing device 61 pressurizes the inside of the second elastic body 5, the holding force can be adjusted by increasing the pressure.

Figure 6A:
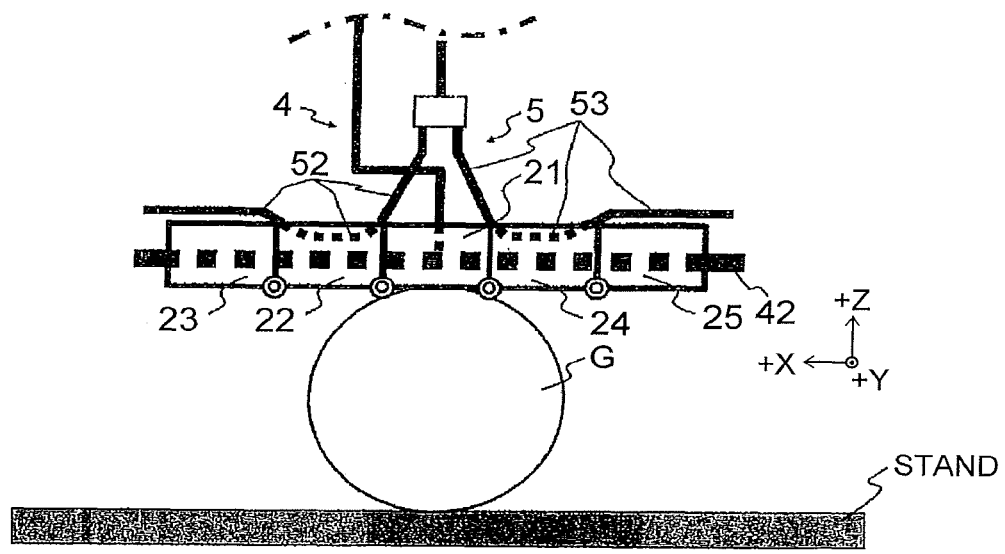
FIGS. 6A and 6B are diagrams showing an example of a case where the holding mechanism holds a spherical object.
Figure 6B:
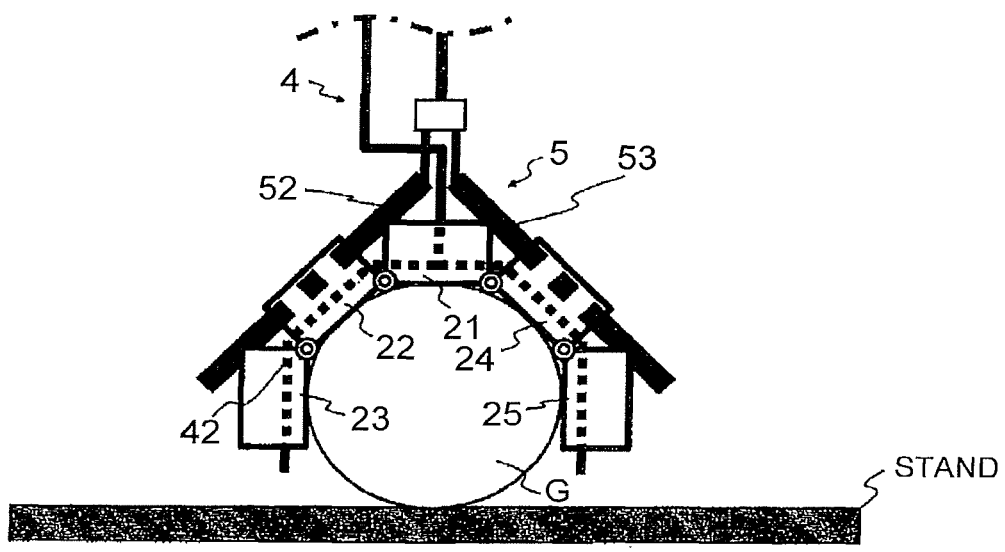

FIGS. 6A and 6B are diagrams showing an example of a case in which a holding mechanism 1 holds a spherical object G. FIG. 6A is a diagram showing a state immediately before the holding mechanism 1 holds the spherical object G. FIG. 6A is a diagram showing a state in which the holding mechanism 1 is holding the spherical object G. As shown in FIG. 6A, the link 21 of the holding mechanism 1 is in contact with the spherical object G immediately before holding the spherical object G. Thereafter, when the inside of the first elastic body 4 is depressurized by the depressurizing device, and when the inside of the second elastic body 5 is pressurized by the pressurizing device, links are bent in a direction approaching the object G in order from a link closer to the link 21 of the holding mechanism 1. As the fourth portion 52 and the fifth portion 53 are expanded, the links come into contact with the object G along the shape of the object G. As shown in FIG. 6B, the link 2 that is in the holding state comes into contact with the object G so as to follow the shape of the object G. In a case of releasing the object G held by the holding mechanism 1, the control device 120 may control the pressure source 6 such that the holding mechanism 1 is in an opened state.

Next, the operation of the handling robot system 100 in a case in which the handling robot system 100 holds and conveys the object G will be described.

Figure 7:
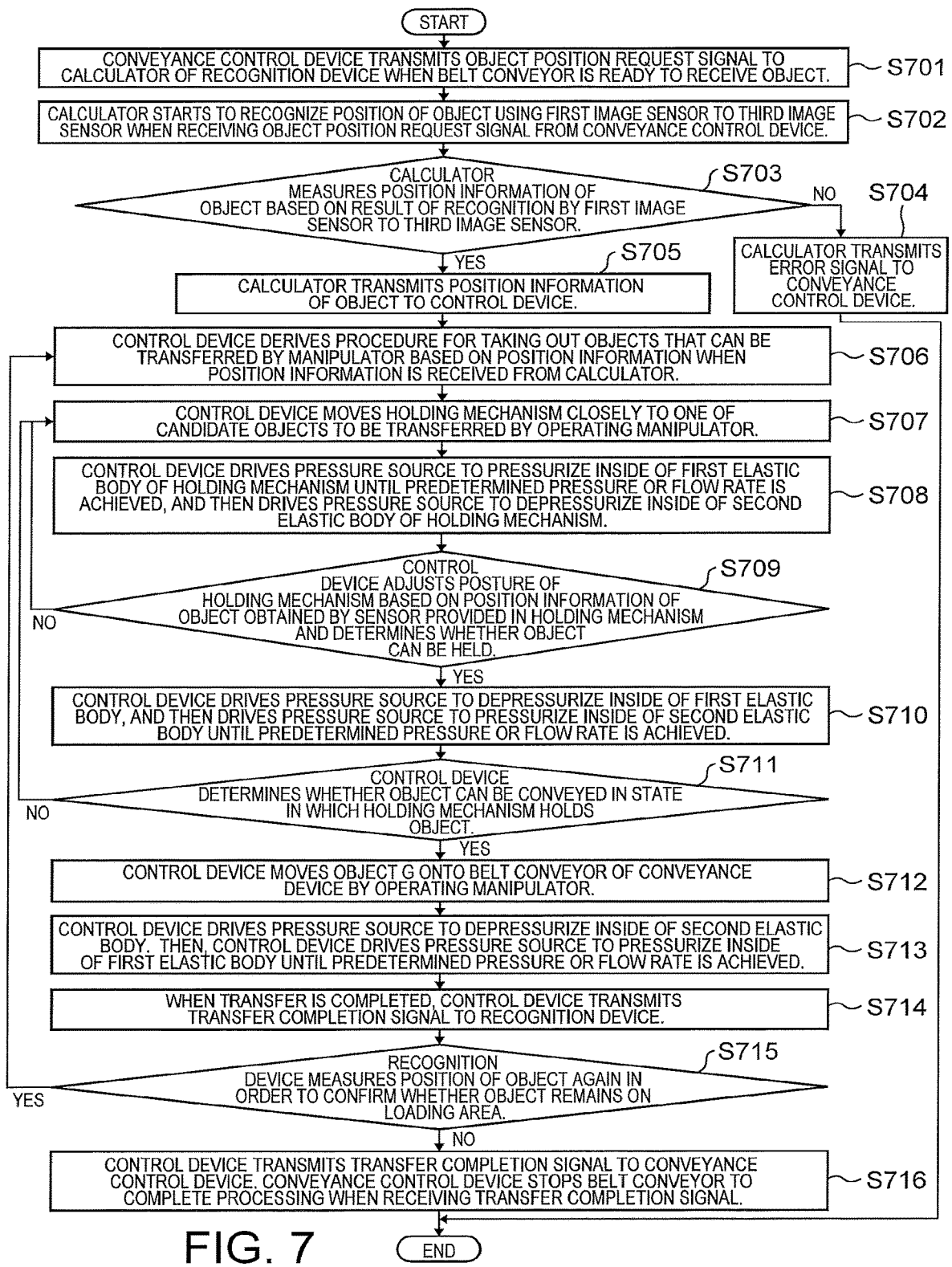
FIG. 7 is a flowchart showing an example of holding and conveying operation of a handling robot system.

FIG. 7 is a flow diagram of an example of an example of holding and conveying operation of the handling robot system.

First, the conveyance control device 142 of the conveyance device 140 transmits an object position request signal to the calculator 134 of the recognition device 130 when the belt conveyor 141 is ready to receive the object G (step 701).

When the calculator 134 receives the object position request signal from the conveyance control device 142, the calculator 134 starts to recognize the position of the object G on the loading area 150 using the first image sensor 131 to the third image sensor 133 (step 702).

The calculator 134 measures position information of the object G, based on a result of recognition by the first image sensor 131 to the third image sensor 133 (step 703). If no object G is detected (No in step 703), the calculator 134 transmits an error signal to the conveyance control device 142 (proceed to End in step 704). When the object G is detected (Yes in step 703), the calculator 134 transmits the position information of the object to the control device 120 (step 705).

When the control device 120 receives the position information from the calculator 134, the control device 120 derives a procedure for taking out objects G that can be transferred by the manipulator 110, based on the position information (step 706).

The control device 120 moves the holding mechanism 1 closely to one of candidate objects G to be transferred by operating the manipulator 110 (step 707).

The control device 120 drives the pressure source 6 to pressurize the inside of the first elastic body 4 of the holding mechanism 1 until a predetermined pressure or a predetermined flow rate is achieved. Furthermore, the pressure source 6 is driven to depressurize the inside of the second elastic body 5 (step 708). As a result, the holding mechanism 1 is in an opened state.

The control device 120 adjusts a posture of the holding mechanism 1 based on the position information of the object G obtained by the sensor provided in the holding mechanism 1, and determines whether or not the object G can be held (step 709).

If the control device 120 determines that the object G can be held (Yes in step 709), the control device 120 drives the pressure source 6 to depressurize the inside of the first elastic body 4. Further, the pressure source 6 is driven to pressurize the inside of the second elastic body 5 until a predetermined pressure or a predetermined flow rate is achieved (step 710). If it is determined that the holding mechanism cannot be held (No in step 709), the control device 120 allows the holding mechanism 1 to access the vicinity of the object G in another direction (return to step 707).

The control device 120 determines whether the object G can be conveyed in a state in which the holding mechanism 1 holds the object G (step 711). The determination in the control device 120 is performed based on, for example, a contact state between the link 2 and the object G detected by the sensor, a weight of the object G when the object G is lifted, or the like.

When the control device 120 determines that it is possible to convey the object G (Yes in step 711), the control device 120 operates the manipulator 110 to move the object G onto the belt conveyor 141 of the conveyance device 140 (step 712).

When the control device 120 determines that it is hard to convey the object G (No in step 711), the control device 120 registers the object G as a non-transferable object. The transfer of another candidate object G to be transferred is performed (return to step 707).

The control device 120 drives the pressure source 6 to depressurize the inside of the second elastic body 5. Substantially, the control device 120 drives the pressure source 6 to pressurize the inside of the first elastic body 4 until a predetermined pressure or a predetermined flow rate is achieved (step 713). As a result, the object G is transferred onto the belt conveyor 141.

When the transfer is completed, the control device 120 transmits a transfer completion signal to the recognition device 130 (step 714).

The recognition device 130 again performs position measurement of the object G in order to confirm whether an object G remains on the loading area 150 (step 715). When a candidate object G to be transferred remains (Yes in step 715), the calculator 134 transmits the position information to the control device 120, and the object G is transferred (return to step 706). When the object G does not remain (No in step 715), the control device 120 transmits a transfer completion signal to the conveyance control device 142. When the conveyance control device 142 receives the transfer completion signal, the conveyance control device 142 stops the belt conveyor 141 to complete processing (step 716). In addition, when the conveyance control device 142 receives the transfer completion signal, the conveyance control device 142 may issue a warning or the like for informing the operator of it. The operator who has heard the warning may replace the loading area (for example, cage truck) where the object G is absent, with another loading area (for example, cage truck) where the object G is loaded.

Although the number of links 2 has been described as being five, embodiments are not limited thereto. When the holding mechanism 1 according to the present embodiment is configured by at least two or more links, it is possible to clamp the object G, and the same working effect can be obtained. Further, even when the holding mechanism is configured by five or more links, the same working effect can be obtained. Although the links 22 to 25 have been described as respectively having the holes H2 to H5, the holes H2 to H5 are not essential configurations. When the thicknesses of the flat tubes of the first elastic body 4 and the second elastic body 5 at the time of contraction are sufficiently thin, the hole may be eliminated.

Although the holding mechanism 1 and the control device 120 have been described as separate configurations, embodiments are not limited thereto. The holding mechanism 1 may have some or all of the functions of the control device 120.

Since the holding mechanism 1 according to the present embodiment holds the object G using force caused by a change in pressure of two elastic bodies, it is possible to flexibly hold the object G with high compliance.

In the holding mechanism 1 according to the present embodiment, since the links follows the outer shape of the object G by using the plurality of links 2, objects of various shapes can be held.

In addition, the holding mechanism 1 according to the present embodiment can have a very simple configuration by including the link and the elastic body as main configurations.

Furthermore, since the holding mechanism 1 according to the present embodiment is provided with various sensors such as an angle sensor, a contact sensor, a pressure sensor, a flow rate sensor, a weight sensor and the like, the holding mechanism 1 can detect the transfer environment of the object G, the holding state of the object G, and the like. Further, these pieces of information can be outputted to the control device 120.

In addition, the holding mechanism 1 according to the present embodiment includes a sensor that acquires the position and distance information of a target object to be held. Therefore, the position and posture of the target object to be held can be detected accurately.

Furthermore, in the handling robot system 100 according to the present embodiment can accurately and safely hold an object G by combination of recognition of the recognition device 130 with sensing of various sensors of the holding mechanism 1.

The handling robot system 100 according to the present embodiment includes a picking device and an inspection device that independently moves to a shelf on which an object G is placed and performs picking or inspection of the object G. In addition, by equipping a cargo bed in which an object G is received, an object dispensing device and a loading device for delivering the object G from the cargo bed to a shelf or the like are included. In addition, an unloading device for unloading objects G loaded on a cargo truck or the like is included.

Second Embodiment

Figure 8A:
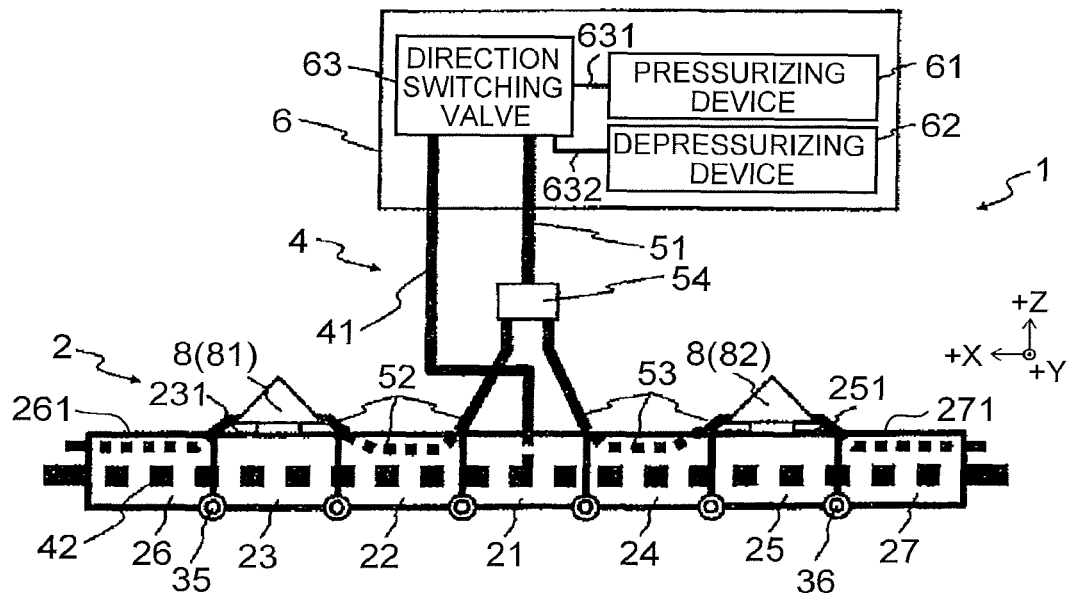
FIGS. 8A and 8B are diagrams showing an example of a holding mechanism according to the second embodiment.
Figure 8B:
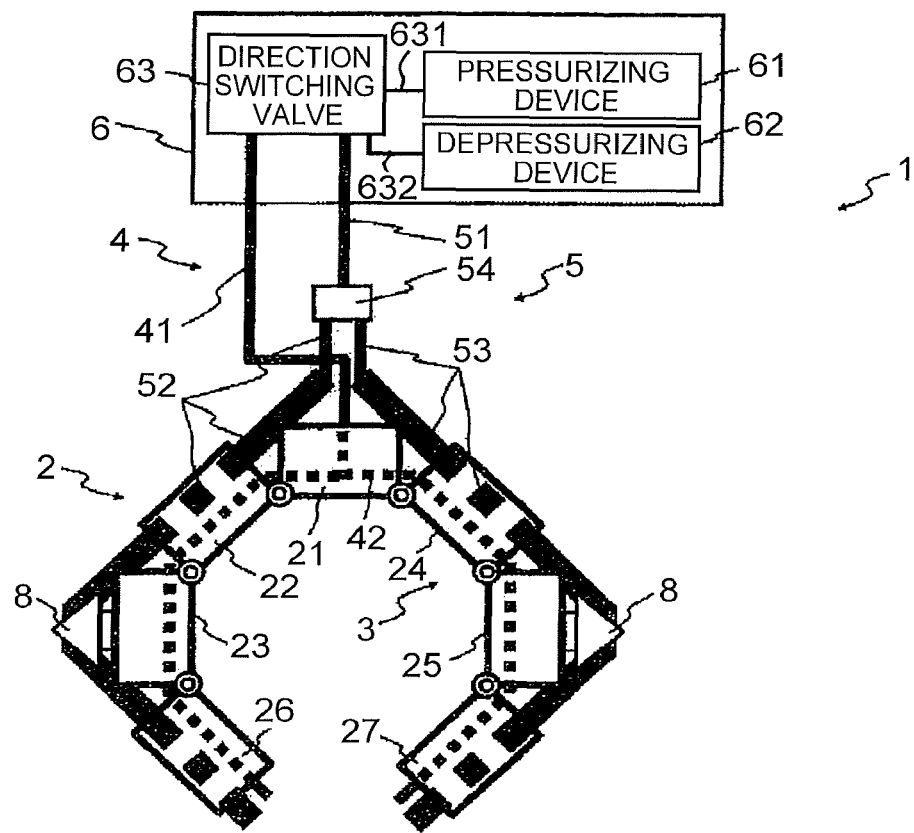

A second embodiment will be described with reference to FIGS. 8A and 8B. FIGS. 8A and 8B are diagrams showing an example of a holding mechanism 1 according to the second embodiment. FIG. 8A is a front view of the holding mechanism that is in an open state as seen in the +Y direction. FIG. 8B is a front view of the holding mechanism that is in an open state as seen in the +Y direction.

As shown in FIGS. 8A and 8B, the holding mechanism 1 according to the second embodiment differs from the holding mechanism according to the first embodiment in that the links 2 are total seven links 21 to 27, the number of rotary joints 3 (31 to 36) which respectively connect the links 21 to 27 are six, and the angle changing part 8 is provided.

Other configurations of the holding mechanism are identical to those of the holding mechanism according to the first embodiment.

The link 26 is arranged adjacent to the link 23, and is connected to be rotatable at the rotary joint 35. The link 27 is arranged adjacent to the link 25, and is connected to be rotatable at the rotary joint 36.

The link 26 and the link 27 have the same configuration as other links 22 to 25. That is, holes H6 (not shown) and H7 (not shown) are respectively provided in the wall surfaces 261 and 271 of the links 26 and 27 in the +Z direction.

The second portion 42 of the first elastic body 4 is arranged along the links 21 to 27. In addition, the fourth portion 52 of the second elastic body 5 is inserted from the hole H2 between the link 21 and the link 22, and protruded to the outside of the link 2 from the hole H3 of the link 23 through the inside of the link 22. Furthermore, the protruding fourth portion 52 is inserted from the hole H6 of the link 26 and passes through the inside of the link 26. That is, the fourth portion 52 is interposed so as to be along the second portion 42 of the first elastic body 4 from between the link 23 and the link 26. In addition, the fifth portion 53 of the second elastic body 5 is inserted from the hole H4 between the link 21 and the link 24, and protruded to the outside of the link 2 from the hole H5 of the link 25 through the inside of the link 22. Furthermore, the protruding fifth portion 53 is inserted from the hole H7 of the link 27 and passes through the inside of the link 27. That is, the fifth portion 53 is interposed so as to be along the second portion 42 of the first elastic body 4 from between the link 25 and the link 27.

The angle changing part 8 is provided on the wall surface 231 of the link 23 and the wall surface 251 of the link 25 in the +Z direction, respectively. The angle changing part 8 changes a bending angle at the time of expansion of the fourth portion 52 and the fifth portion 53 of the second elastic body 5. In other words, when the second elastic body 5 is expanded, an angle between the fourth portion 52 and the fifth portion 53 becomes a predetermined angle around the coupling part 54, but angles of the fourth portion 52 and the fifth portion 53 are respectively changed by the angle changing part 8 as a boundary.

As shown in FIG. 8A, in the state in which the holding mechanism 1 is opened, the link 2 and the angle changing part 8 are fixed in a direction along the X-direction.

As shown in FIG. 8B, in the state in which the holding mechanism 1 is closed, the direction of the fourth portion 52 is changed by the angle of +90° with the angle changing part 8(81) as a boundary. In addition, the direction of the fifth portion 53 is changed by the angle of −90° with the angle changing part 8(82) as a boundary. The angle changing part 8 is configured by a roller (not shown) contacting the second elastic body 5 and a clip configured to determine a bending angle. The angle changing part 8 may be anything as long as it can change the bending angles of the fourth portion 52 and the fifth portion 53.

In the holding mechanism according to the present embodiment, if a target object to be held is a known object, the link is bent at an arbitrary angle, so that the object can be safely held without being damaged.

In addition, although the holding mechanism according to the present embodiment has been described as the angle changing part 8 is respectively provided in the link 23 and the link 25, it is not limited thereto. That is, the changing positions of the bending angles of the fourth portion 52 and the fifth portion 53 can be appropriately changed depending on a shape of the object G and the like. In addition, the number of links is seven and the number of rotary joints is six, but they are not limited to the above numbers. The numbers of links and rotary joints may be plural more than the above numbers.

Third Embodiment

Figure 9A:
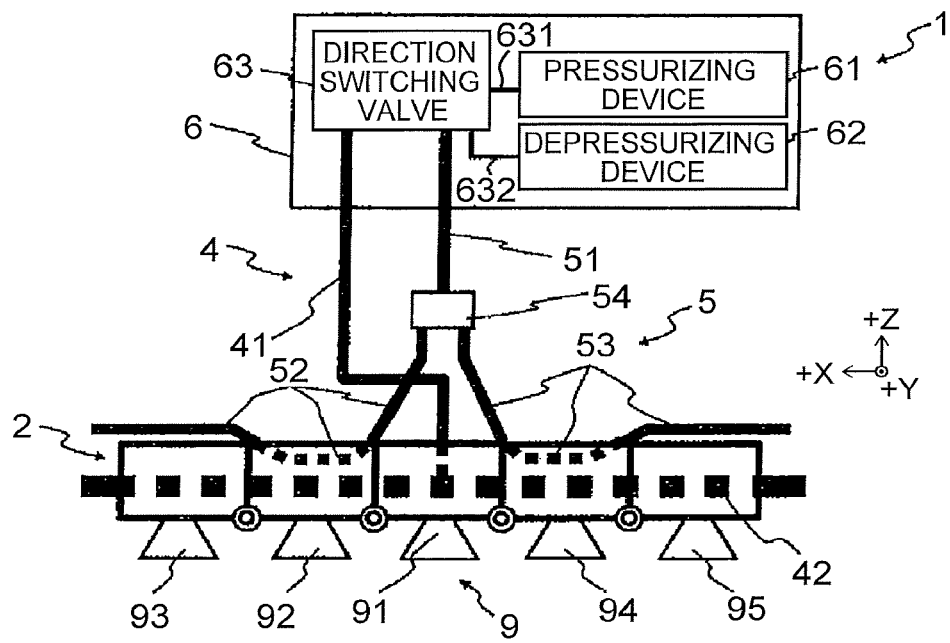
FIGS. 9A and 9B are diagrams showing an example of a holding mechanism according to the third embodiment.
Figure 9B:
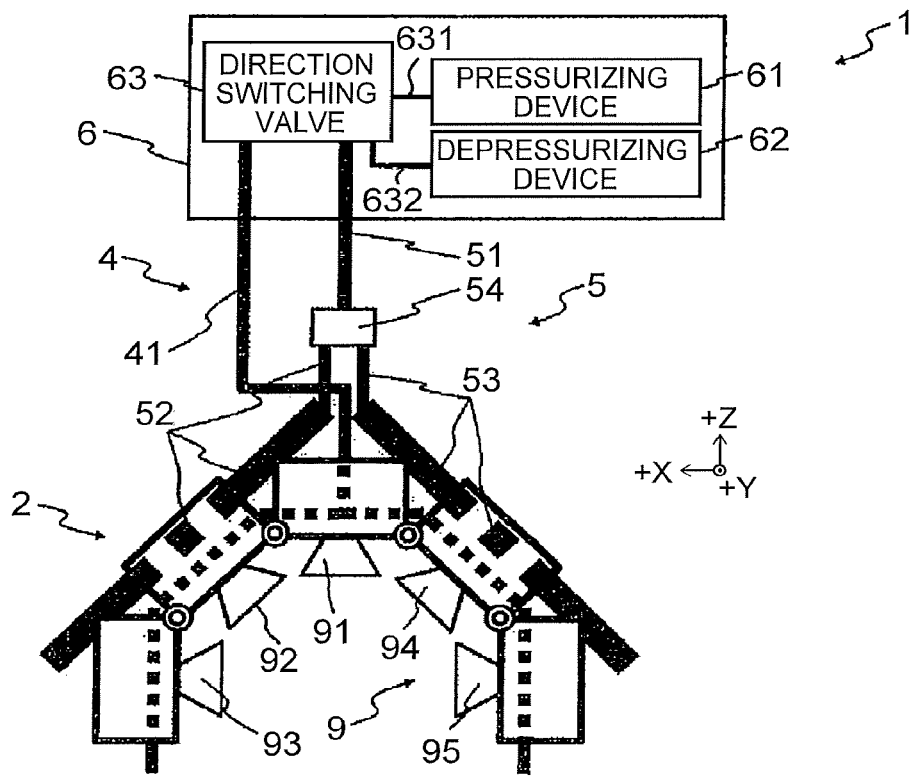

A third embodiment will be described with reference to FIGS. 9A and 9B. FIGS. 9A and 9B are diagrams showing an example of a holding mechanism according to the third embodiment. FIG. 9A is a front view of the holding mechanism in an opened state as seen in the +Y direction. FIG. 9B is a front view of the holding mechanism in a closed state as seen in the +Y direction.

As shown in FIGS. 9A and 9B, in the holding mechanism 1 according to the third embodiment, a suction part 9 is installed in each link. Other configurations of the holding mechanism are identical to those of the holding mechanism according to the first embodiment.

The suction part 9 is provided on a surface of the link which contacts the object G. As shown in FIGS. 9A and 9B, the suction parts 91 to 95 are provided in the links 21 to 25, respectively. Each of the suction parts 91 to 95 may be configured by combination with a vacuum generator such as a vacuum ejector, a vacuum pump, or a vacuum blower. Each of the suction parts 91 to 95 is a suction cup made of rubber or resin. In addition, for example, adhesives, adhesive tapes, and the like may be used instead of the suction cup. The number of suction parts provided in one link is not limited to one, but may be plural.

Furthermore, the suction parts 91 to 95 may be respectively connected to the pressure source 6 via tubes (not shown). The suction may be performed by depressurizing a space where the suction part and the object G are in contact with each other, by the depressurizing device 62 of the pressure source 6. In addition, the tubes (not shown) may also be connected to separate pressure sources, respectively.

Since the holding mechanism according to the present embodiment can hold the object G using the suction of the suction part 9 even in the opened state, it is possible to appropriately select a shape of the holding mechanism according to the shape of the object G.

In addition, the holding mechanism according to the present embodiment enables holding by combination of clamping by the link 2 with suction by the suction part 9, thereby holding the object G more stably.

In addition, the holding mechanism according to the present embodiment can hold an object G larger than the holding mechanism since the suction parts 91 to 95 suck the object G individually.

In addition, the holding mechanism according to the present embodiment can hold the object G using another suction part even when any of the suction parts 91 to 95 is damaged.

Fourth Embodiment

Figure 10A:
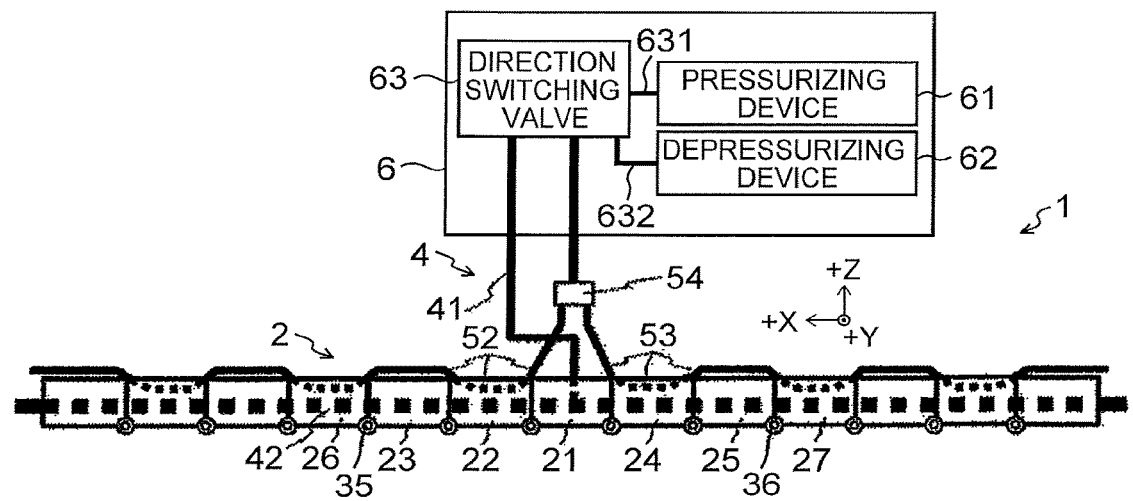
FIGS. 10A, 10B and 10C are diagrams showing an example of a holding mechanism according to the fourth embodiment.
Figure 10B:
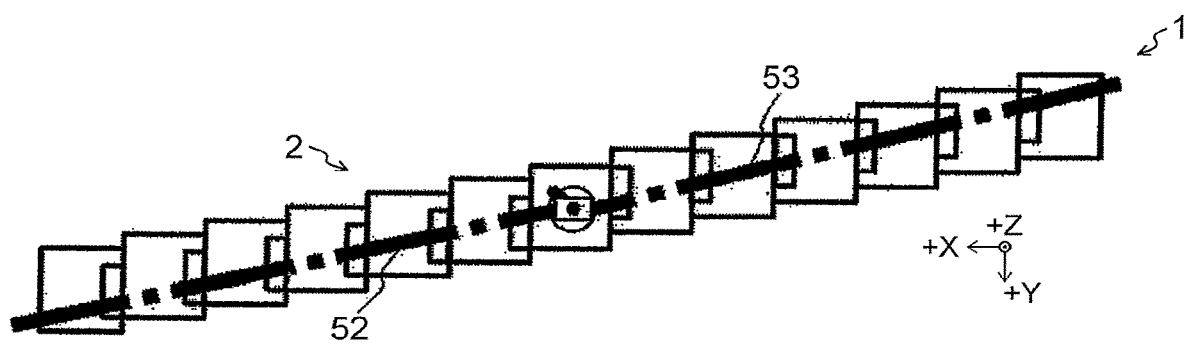
Figure 10C:
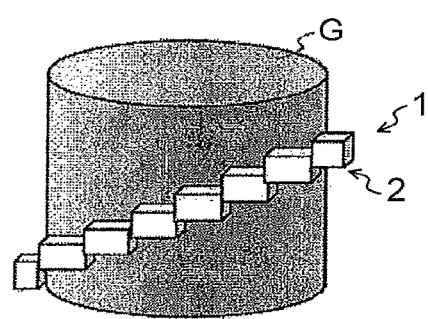

A fourth embodiment will be described with reference to FIGS. 10A, 10B and 10C. FIGS. 10A, 10B and 10C are diagrams showing an example of a holding mechanism according to the fourth embodiment. FIG. 10A is a front view of the holding mechanism in an opened state as seen in the +Y direction. FIG. 10B is a front view of the holding mechanism in a closed state as seen in the +Z direction. FIG. 10C is a perspective view showing an example of a state in which the holding mechanism is closed.

As shown in FIG. 10B, the holding mechanism according to the fourth embodiment has a configuration in which a plurality of links are displaced (shifted) from each other in the Y direction. Furthermore, the number of links and the number of rotary joints are different as compared to those of the holding mechanism according to the first embodiment. Other configurations of the holding mechanism are identical to those of the holding mechanism according to the first embodiment.

The arrangement of the link 2 will be described in detail. The links positioned in the +X direction with the link 21 as a reference are arranged to be displaced from each other by a predetermined distance in the +Y direction. In addition, the links positioned in the −X direction with the link 21 as a reference are arranged to be displaced from each other by a predetermined distance in the −Y direction. As a result, when the inside of the first elastic body 4 of the holding mechanism is depressurized, and when the inside of the second elastic body 5 of the holding mechanism is pressurized and expanded (when the holding mechanism is in a closed state), it is possible to hold the object G with the link 2 wound around the object G. As shown in FIG. 10C, it can be seen that the link 2 is spirally wound around a cylindrical object. Since the links are arranged to be displaced from each other, it is possible to avoid contact between the links and hold objects G having various sizes or thicknesses.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A holding mechanism comprising:
   a plurality of links rotatably connected to one another at ends of the links;
   a first elastic body disposed along the links, the first elastic body being a tube capable of expanding and contracting due to a pressure of inside of the tube;
   a second elastic body interposed between adjacent links of the links so as to be along the first elastic body, the second elastic body being a tube capable of expanding and contracting due to a pressure of inside of the tube; and
   a pressure source capable of changing a pressure of inside of the first elastic body or the second elastic body.

2. The holding mechanism according to claim 1, further comprising:
   a measuring part capable of measuring a pressure of inside of the first elastic body and the second elastic body.

3. The holding mechanism according to claim 1, further comprising:
   a plurality of joints respectively connected between the adjacent links.

4. The holding mechanism according to claim 3, further comprising:
   a sensor capable of measuring a drive amount of each of the joints.

5. The holding mechanism according to claim 1,
   wherein the pressure source expands the second elastic body after contracting the first elastic body.

6. The holding mechanism according to claim 1,
wherein the pressure source contracts the second elastic body after expanding the first elastic body.

7. The holding mechanism according to claim 1, further comprising:
a suction part provided in at least one of the links.

8. The holding mechanism according to claim 1, further comprising:
a support part configured to support the second elastic body in a predetermined direction.

9. The holding mechanism according to claim 1,
wherein the links are connected to be displaced from each other by a predetermined distance in a predetermined direction.

10. A manipulator comprising:
the holding mechanism according to claim 1; and
a driving mechanism capable of moving the holding mechanism.

11. A handling robot system comprising:
the manipulator according to claim 10; and
a control device that controls driving of the manipulator.

12. A holding mechanism comprising:
a first link;
a second link rotatably connected to the first link;
a third link rotatably connected to the first link;
a first elastic body disposed along the first link, the second link, and the third links, the first elastic body being a tube capable of expanding and contracting due to a pressure of inside of the tube;
a second elastic body interposed between the first link and the second link and between the first link and the third link so as to be along the first elastic body, the second elastic body being a tube capable of expanding and contracting due to a pressure of inside of the tube; and
a pressure source capable of changing a pressure of inside of the first elastic body or the second elastic body.

13. The holding mechanism according to claim 12, further comprising:
a measuring part capable of measuring a pressure of inside of the first elastic body and the second elastic body.

14. The holding mechanism according to claim 12,
wherein the links are connected to be displaced from each other by a predetermined distance in a predetermined direction.

15. A manipulator comprising:
the holding mechanism according to claim 12; and
a driving mechanism capable of moving the holding mechanism.

16. A handling robot system comprising:
the manipulator according to claim 15; and
a control device that controls driving of the manipulator.

* * * * *